United States Patent
Yoon

(10) Patent No.: US 7,496,059 B2
(45) Date of Patent: Feb. 24, 2009

(54) ENERGY-EFFICIENT MEDIUM ACCESS CONTROL PROTOCOL AND SYSTEM FOR SENSOR NETWORKS

(75) Inventor: Chang-June C. J. Yoon, Edison, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 545 days.

(21) Appl. No.: 11/007,259

(22) Filed: Dec. 9, 2004

(65) Prior Publication Data
US 2006/0128349 A1   Jun. 15, 2006

(51) Int. Cl.
*G08C 17/00* (2006.01)

(52) U.S. Cl. ............... 370/311; 370/310.1; 340/870.01

(58) Field of Classification Search ............... 370/311, 370/310.1; 340/870.01; 455/41.2
See application file for complete search history.

(56) References Cited

U.S. PATENT DOCUMENTS

| | | | |
|---|---|---|---|
| 5,371,734 A | 12/1994 | Fischer | |
| 6,067,297 A | 5/2000 | Beach | |
| 6,233,235 B1* | 5/2001 | Burke et al. | 370/356 |
| 6,285,892 B1 | 9/2001 | Hulyalkar | |
| 6,292,508 B1* | 9/2001 | Hong et al. | 375/134 |
| 6,690,655 B1* | 2/2004 | Miner et al. | 370/278 |
| 6,697,650 B2 | 2/2004 | Hulyalkar | |
| 6,735,448 B1 | 5/2004 | Krishnamurthy et al. | |
| 6,920,342 B2 | 7/2005 | Reiner | |
| 2001/0029197 A1 | 10/2001 | Hulyalkar | |
| 2002/0044533 A1 | 4/2002 | Bahl et al. | |
| 2003/0012168 A1 | 1/2003 | Elson et al. | |
| 2003/0060168 A1 | 3/2003 | Teibel | |
| 2003/0099221 A1 | 5/2003 | Rhee | |
| 2003/0142645 A1 | 7/2003 | Belcea | |
| 2003/0152041 A1* | 8/2003 | Herrmann et al. | 370/310 |
| 2003/0179742 A1 | 9/2003 | Ogier et al. | |
| 2003/0203742 A1 | 10/2003 | D'Souza et al. | |
| 2003/0210658 A1 | 11/2003 | Hernandez et al. | |
| 2003/0228875 A1 | 12/2003 | Alapuranen | |
| 2004/0018839 A1 | 1/2004 | Andric et al. | |
| 2004/0081076 A1 | 4/2004 | Goldstein et al. | |
| 2004/0105401 A1 | 6/2004 | Lee | |
| 2005/0059420 A1* | 3/2005 | Salokannel et al. | 455/522 |

OTHER PUBLICATIONS

Wei, Y. et al.; "Medium Access Control with Coordinated, Adaptive Sleeping for Wireless Sensor Networks"; USC/ISI Technical Report ISI-TR-567, Jan. 2003; 14 pages.

Singh, S. et al.; "PAMAS—Power Aware Multi-Access Protocol with Signalling for Ad Hoc Networks"; ACM Computer Communication Review, vol. 28, No. 3, Jul. 1998; 22 pages.

(Continued)

*Primary Examiner*—Duc Nguyen
*Assistant Examiner*—Angelica M Perez
(74) *Attorney, Agent, or Firm*—Edell, Shapiro & Finnan, LLC

(57) ABSTRACT

An energy efficient MAC protocol for a sensor network that extends the battery life of remotely located wireless nodes by employing MAC operations involving transmission of a wake-up signal with more processing gain, dynamic adjustment of a transmission rate of synchronization messages for fast time synchronization and an energy efficient neighboring node discovery technique.

19 Claims, 12 Drawing Sheets

OTHER PUBLICATIONS

Schurgers, C. et al.; "STEM: Topology Management for Energy Efficient Sensor Networks"; IEEE Aerospace Conference, Mar. 2002; 10 pages.

Cerpa, A. et al.; "ASCENT: Adaptive Self-Configuring sEnsor Networks Topologies"; IEEE Infocom, 2002; 10 pages.

Akyildiz, I. et al.; "A Survey on Sensor Networks"; IEEE Communications Magazine, Aug. 2002; pp. 102-114.

Elson, J. et al.; "Wireless Sensor Networks: A New Regime for Time Synchronization"; *Proceedings of the First Workshop on Hot Topics in Networks*; Oct. 28-29, 2002, Princeton, New Jersey; 6 pages.

So, J. et al.; "A Distributed Self-Stabilizing Time Synchronization Protocol for Multi-hop Wireless Networks"; Technical Report, Jan. 2004; 14 pages.

Sichitiu, M. et al.; "Simple, Accurate Time Synchronization for Wireless Sensor Networks"; Wireless Communications and Networking, WCNC, Mar. 2003; 8 pages.

Elson, J. et al.; "Time Synchronization for Wireless Sensor Networks"; *Proceedings of the 2001 International Parallel and Distributed Processing Symposium (IPDPS)*; Apr. 23-27, 2001; 6 pages.

* cited by examiner

OPTIMIZED LNE PERIOD
$LNE_{OPT} = A1*LNEHOPINTERVAL + A2*BATTERYLIFEINTERVAL + A3*LNECOUNTINTERVAL + RANDOM(LNEXMTINTERVAL)$

CONVENTIONAL LNE PERIOD
$LNE_{CON} = 0.5*LNEXMTINTERVAL + RANDOM(LNEXMTINTERVAL)$

ENERGY-EFFICIENT MEDIUM ACCESS CONTROL PROTOCOL AND SYSTEM FOR SENSOR NETWORKS

STATEMENT REGARDING FEDERALLY SPONSORED RESEARCH OR DEVELOPMENT

This invention was made with U.S. Government support. The U.S. Government may have certain rights in the invention.

FIELD OF THE INVENTION

The present invention relates to an energy efficient medium access control (MAC) protocol for a communication network, such as an unmanned ground sensor (UGS) network.

BACKGROUND OF THE INVENTION

In existing mobile ad hoc networks (MANET), MAC protocol designs can be broadly divided into time-division-multiple-access (TDMA)-based resource allocation and contention based random access protocols. The TDMA-based protocol attempts to determine network connectivity first (i.e., discover the neighbor of each node) and then allocate collision-free channels to links between radio neighbors. The task of allocation of channels (i.e. TDMA slots, frequency hopping, or spread spectrum codes) among nodes becomes very expensive when the nodes are densely located. To ease the assignment problem a hierarchical structure is formed in the network to localize groups of nodes and make the assignment more manageable. However, the management of hierarchical tiers can be energy-expensive for the sensor network.

Bluetooth™ devices are close commercial peers to sensor networks. The Bluetooth protocol is designed to support low bandwidth and short distance (less than 10 m) wireless connections. The Bluetooth topology is a star network where a master node can have up to seven slave nodes to form a piconet. Each piconet uses a centrally assigned TDMA and frequency hopping (FH) pattern. The scalability of a TDMA-based protocol is not as good as that achieved with contention-based protocols. The DCF (distributed coordination function) of IEEE 802.11 is an example of contention-based CSMA/CA (carrier sense multiple access/collision avoidance), and is widely used in MANET because of its simplicity and robustness to the hidden terminal problem. However, the DCF consumes energy continuously because it involves periodically listening to the channel while in idle state. Thus, the conventional random channel access schemes are not suitable for sensor networks.

A power save mechanism (PSM) for the IEEE 802.11 DCF is proposed to periodically listen and sleep to reduce energy consumption. The sleep schedules of all nodes in the network must be synchronized together. That is, they listen at the same time and go to sleep at the same time. However, the PSM in 802.11 is designed for a single-hop network. A sensor-MAC protocol is designed to operate in a multi-hop network and does not assume that all nodes are synchronized together. Again, sensor nodes broadcast periodically a synchronization packet to their immediate neighbors to coordinate their schedule, when to sleep and when to listen. Neighboring nodes still need to periodically update each other with their schedule to prevent long-time clock drift even in sleep mode. Channel access and node wakeup are integrated together in the sensor-MAC protocol.

Power Aware Multi-Access Protocol with Signalling (PAMAS) has been proposed to reduce energy consumption using a second radio channel to detect activity on its neighbors and turning on its main radio in response to such activity. PAMAS does not attempt to reduce idle listening. Topology Manangement for Energy Efficient Sensor Networks (STEM) also use a dual frequency channel setup to wakeup a neighbor and to transmit. The initiator wakes up its neighbors through the wakeup channel and waits for the acknowledgment (ACK) before turning on the data channel. A node must still wake up periodically from its sleep state to listen if any node wants to contact it. Adaptive Self-Configuring Sensor Networks Topologies (ASCENT) adaptively elect active nodes based on measured local connectivity and packet loss information. Active nodes stay awake all the time and perform multi-hop routing, while the rest of the nodes remain passive and periodically check to determine if they should become active.

Time synchronization is a crucial MAC component in wireless sensor networks. Conventional time synchronization schemes like NTP (network time protocol) cannot be applied to sensor networks. The multi-hop time synchronization protocol (MTSP) establishes a time synchronization tree rooted at the fastest node in the wireless network. The MTSP makes the network time converge to a steady state and guarantees an upper bound on the synchronization error in the steady state. This synchronization error bound on the offsets and clock drifts are also used to achieve the tight clock precision. However, a timing stamp at the MAC layer instead of the process generated message approach avoids the well known problem of imperfect physical clock synchronization.

A conventional sensor node achieves the reduction of energy consumption by employing the sleep state in an idle mode, as shown in FIG. 2. A sensor node is referred to as "active" when it is transmitting or receiving data and as "idle" when it is in either a listening state (i.e., listening but not actually receiving data) or a sleeping state (i.e., not listening although the other sensors may be on). Sensor radios must wakeup periodically to see if other nodes or a local node want to send data. If not, then they may go back to sleep. An internal mechanism such as a scheduling algorithm is used to decide when to change from listening to sleeping and vice versa. For example, if a node remains asleep for time $T_S$ then it undergoes a transition to the idle listening state. During the listening state if data arrives from neighbor nodes or it has data to send, the local node changes to the active state. Otherwise, it returns to the sleeping state after $T_L$. After data transmission or reception is finished, the sensor node transitions from the active to the idle state. In a conventional scheme, the nodes must wakeup at the same time to communicate with each other. If time is not synchronized, each node will wakeup at a different time. To maintain the network synchronized, nodes need to exchange messages from time to time to synchronize their clocks with each other and prevent clocks from drifting away.

Due to energy, cost and physical constraints, sensor networks present various design, implementation and deployment challenges. Energy efficient protocols at various levels (i.e. physical layer, MAC layer, logical link control layer, network layer, etc.) are extremely critical for sensor networks. Since the environment is noisy and some nodes can be mobile, the MAC protocol and other link layer protocols must be power-aware and able to minimize collisions with neighbor node's communications.

SUMMARY OF THE INVENTION

Briefly, an energy efficient MAC protocol is provided for a sensor network. Techniques are provided to extend the battery life of remotely located wireless nodes by employing MAC operations involving transmission of a wake-up signal with more processing gain, dynamic adjustment of a transmission rate of synchronization messages for fast time synchronization and a neighboring node discovery technique.

A method of waking up nodes in a wireless communication network is provided that involves transmitting a single wake-up signal by a first node with at least one parameter that increases the range of the wake-up signal; receiving the wake-up signal from the first node at at least a second node, and in response thereto, the second node entering a wake-up state; and in response to the second node entering the wake-up state, rebroadcasting the wake-up signal to wake-up other nodes prior to the second node switching to a higher power consumption receiver to receive a synchronization message. The first node may increase processing gain of the wake-up signal that it transmits by adjusting one or more of a bit rate (lower bit rate), chip rate (higher chip rate for a spread spectrum modulation), and bandwidth.

In addition, a method of synchronizing nodes in a communication network is provided that involves adaptively selecting a transmission rate at which synchronization messages are to be transmitted from a synchronized node, the transmission rate being selected as a function of one or more factors including: a number of node hops between the synchronized node and a certain node (e.g., a central node), a remaining available power level of the synchronized node, and a number of a synchronization message previously transmitted by the synchronized node in a current network synchronization sequence; and transmitting synchronization messages from the synchronized node to other nodes in the communication network according to the selected transmission rate.

Still further, a method of performing discovery of nodes in a wireless communication network prior to bi-directional communication therebetween is provided involving determining a level of remaining available power at a node in the wireless communication network; selecting a transmission rate at which to transmit node discovery messages from the node as a function of the level of remaining available power; and transmitting node discovery messages from the node according to the selected transmission rate.

These methods may be embodied in a wireless communication network comprising a central node that transmits a single wake-up signal with at least one parameter that increases the range of the wake-up signal, and a plurality of remote nodes that collect data and transmit the data to the central node.

DETAILED DESCRIPTION

Figure 1:
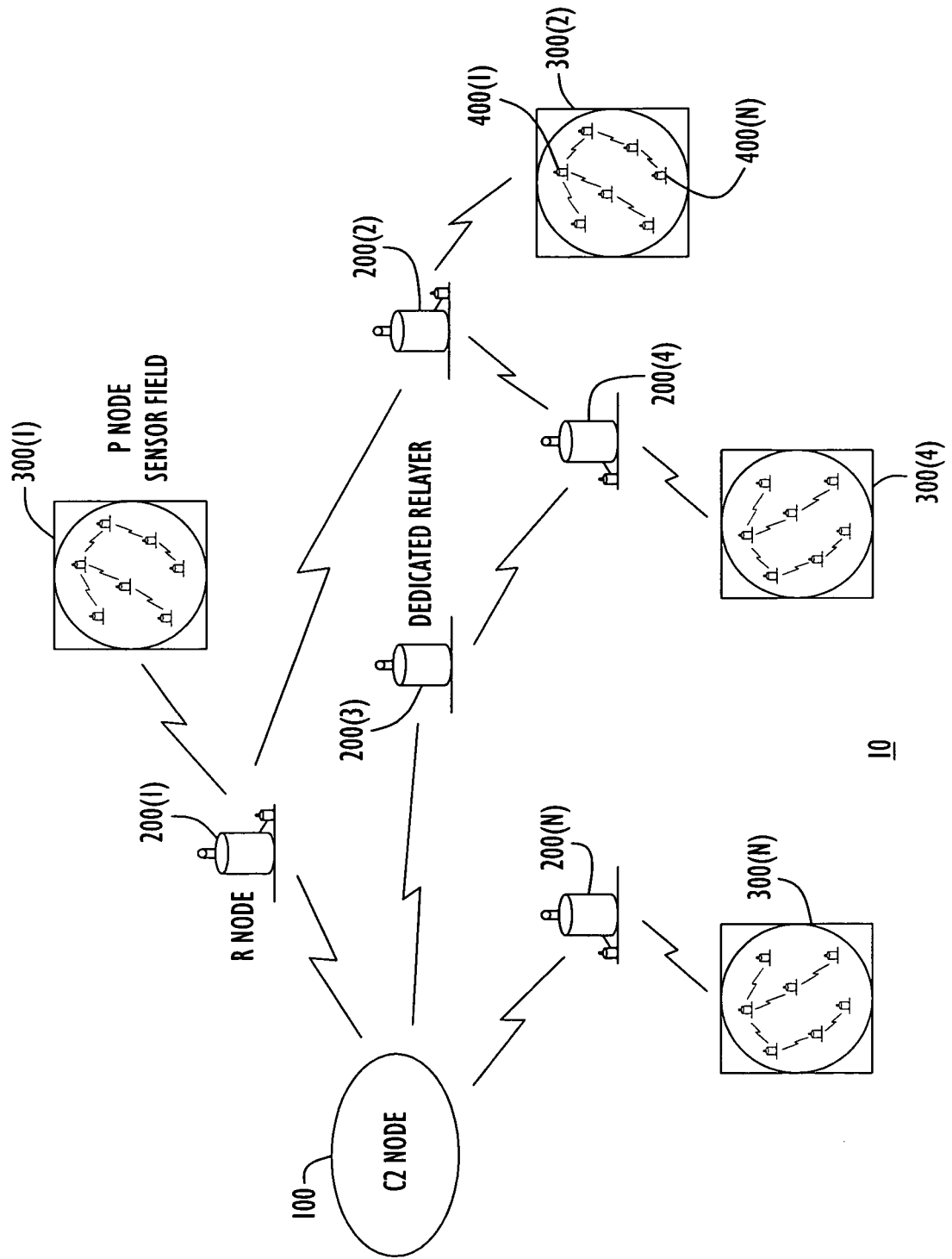
FIG. 1 is a network diagram of a sensor node radio network architecture.

FIG. 1 illustrates a wireless unmanned ground sensor (UGS) network 10 that is an example of the type of wireless sensor network in which the MAC techniques described herein may be useful. The unique system requirements of the UGS network 10 affect virtually every aspect of its design; typically, routing and link layer protocols. In the UGS network, the sensor derived data is forwarded to a Command & Control vehicle, called a C2 node, for processing. Sensors are deployed in the field in groups where sensors are located in proximity to each other. Sensors (referred to as P nodes) form a multi-hop network using short-range radios. Each sensor network also includes long-range-radio-equipped R (remote) nodes used to send sensor data back to the C2 node. For purposes of the following description, the C2 node is assigned reference numeral 100, the R nodes are assigned reference numeral 200(1) to 200(N), a P sensor field is assigned reference numeral 300(1) to 300(N) and P sensors are assigned reference numeral 400(1) to 400(N).

The P node sensors 400(i) perform simple sensing tasks such as target detection, location, and simple target classification using acoustic, seismic, magnetic, and simple motion detection. Data from a number of P node sensors 400(i) are transmitted to a central collection R node 200(i). The R node 200(i) associated with each P sensor field 300(i) gathers data from all of its subtending sensors (P nodes) and processes and fuses that data to remove redundant information and false alarms. In addition to the information reported by the P nodes 300(i), the R node 200(i) may use locally attached sensors to further enhance the information that was received. Such a P node will be connected to an R node radio via an RS-232 link. The R node radio provides the networking that forwards this data to the C2 node 100. If the distance between the C2 node 100 and the nearest R node 200(i) exceeds the maximum RF range, additional R nodes may be used as relays.

Figure 2:
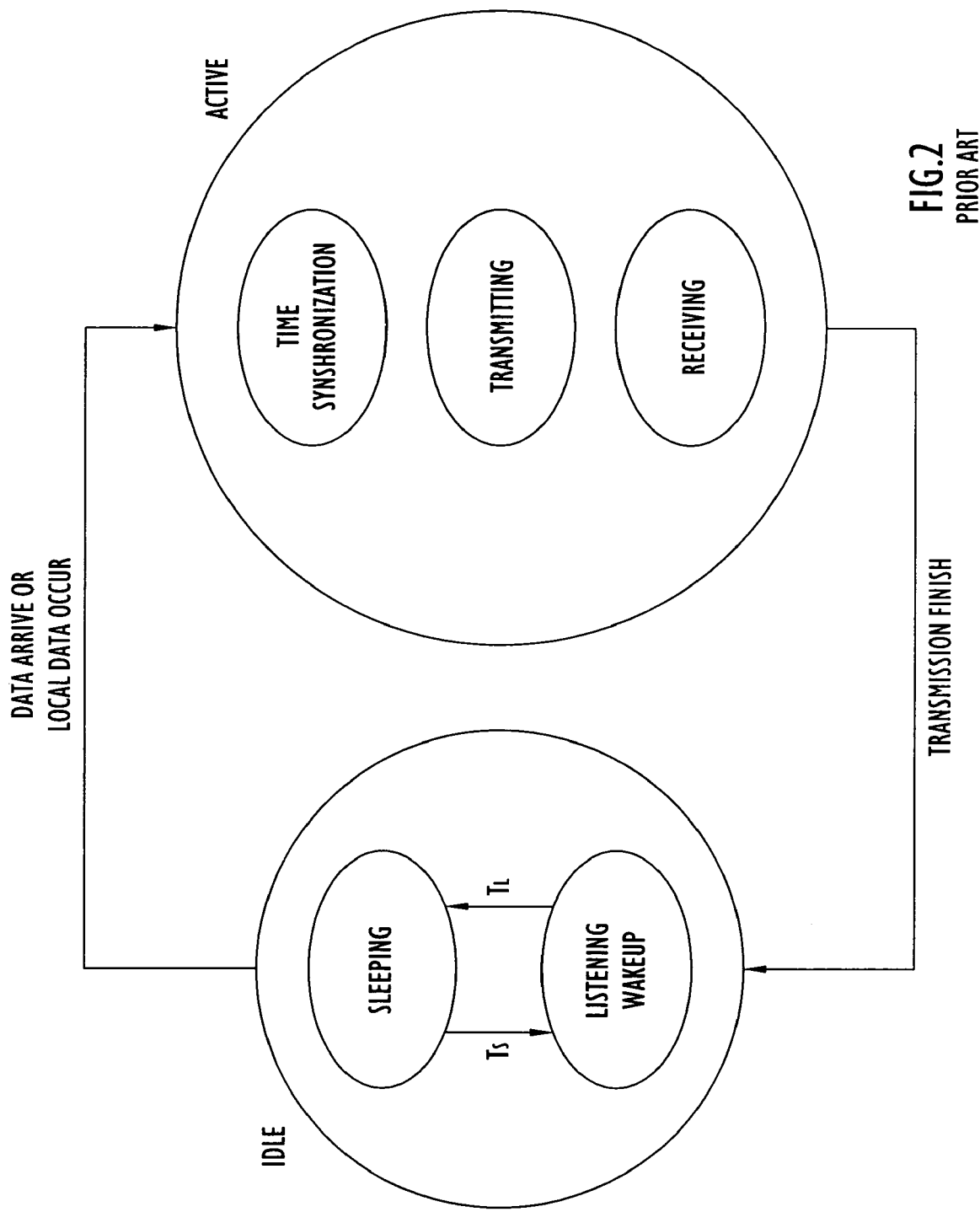
FIG. 2 is a state diagram showing a high level flow of a prior art sensor node radio system.

With reference to the flow diagram of FIG. 2 depicting a prior art MAC protocol, the following describes drawbacks encountered in the sensor networks using existing MAC protocols.

All sensor nodes need to coordinate their sleep schedules as opposed to doing so arbitrarily. The frequent and periodic switching between sleeping and listening states waste energy in the idle.

All sensor nodes are assumed to have the same capabilities and can perform the same sensing and communication functions. This is based on the fairness in the contention-based random access schemes they employ.

In sensor networks, node densities, as well as RF ranges are drastically different from those of the conventional add-hoc wireless networks such as MANET systems.

A node wakes up periodically from its sleep state to listen if a neighbor want to contact it. A wakeup ACK is needed to switch to normal communications. This, again, consumes energy.

Time synchronization in the conventional sensor network requires that a node synchronize to a faster node. Whenever, a faster node joins the network, the network must be re-synchronized and that consumes energy, unnecessarily.

Figure 3:
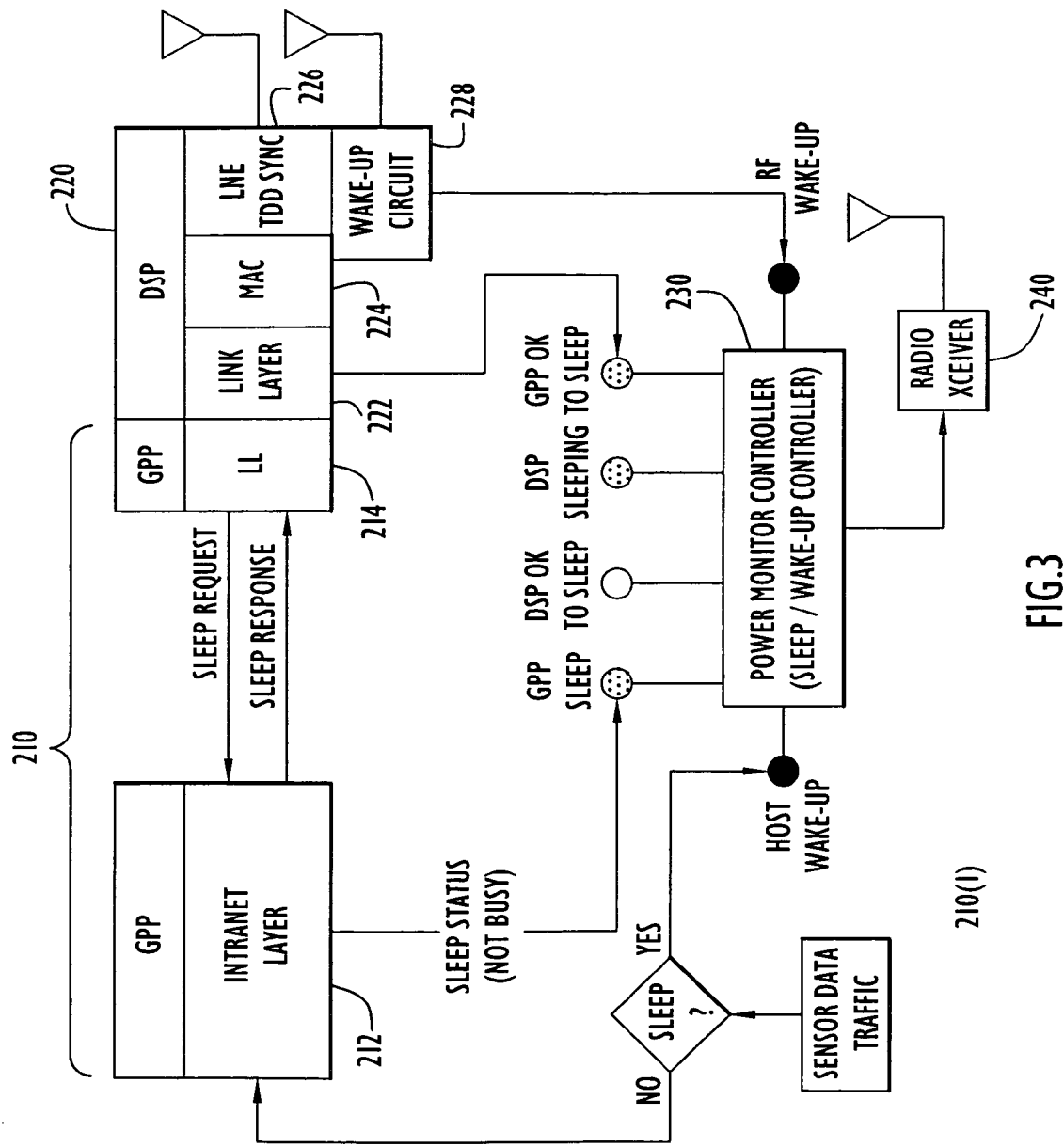
FIG. 3 is a system block diagram of a sensor node radio system.

With reference to FIG. 3, a block diagram of the significant components and functions of an R node will be described. An R node 200($i$) comprises a general purpose processor (GPP) 210 and a digital signal processor (DSP) 220. The GPP 210 manages intranet layer functions 212 and some aspects of link layer (LL) functions 214. The DSP 220 manages link layer functions 222, MAC functions 224, late network entry (LNE) synchronization functions 226 and a wake-up circuit 228 that generates an RF wake-up signal. There is also a power monitor controller 230, also called a sleep/wake-up controller that monitors power consumption and availability and is coupled to a radio transceiver 240. The wake-up circuit 228 can wake-up the DSP 220 from a sleep mode.

When the R nodes 200($i$) are initially deployed, they will be configured by a relayer and enter a sleep state after their activity timers expire. They will take no further action until the C2 node 100 has issued a network formation command. This feature prevents deployed sensors from becoming prematurely active and consequently depleting their batteries. In order to organize the UGS network, the C2 node 100 issues a wakeup command, followed by a LNE message. The LNE message is used to establish time synchronization throughout the UGS network and to convey a limited amount of topology information. The C2 node 100 then issues an organization command, causing the R nodes 200(1) to 200(N) to exchange topology information with each other. If there is no data traffic to be sent and the activity timer is expired, the nodes will enter sleep mode to conserve battery power and start to monitor the wake-up channel, as shown in FIG. 3.

The design of the UGS network takes advantage of the fact that P sensor nodes 300(1) to 300(N) do not move and, therefore, do not require frequent routing updates. In the UGS network domain, the C2 node 100 is always either the source or the destination of all traffic and any node's configuration can be changed by a host command. The C2 node 100 can leave, join, and be configured any time during deployment.

The R nodes 200(1) to 200(N) form a dynamic self-organizing RF intranet headed by the C2 node 100. The C2 node provides the RF timing for the UGS network and is the head of the connectivity tree of the RF network. The following features are part of the UGS network.

1. The C2 node 100 manages network organization.
2. Most traffic is between the C2 node 100 and R nodes 200(1) to 200(N). The majority of that traffic is from R node 200($i$) to C2 node 100.
3. The C2 node 100 has unlimited battery power.
4. Two Wakeup Sequences are available (C2initiated and Sensor initiated).
5. The UGS network is an IP Subnet.
6. The LNE message can carry net organization parameters.
7. The DSP 220 in an R node 200($i$) can wakeup from sleep in less than 150 ms, for example.
8. The GPP 210 in an R node 200($i$) can wakeup from sleep in less than 250 ms, relatively slower than the DSP 220.
9. The DSP 220 and GPP 210 in an R node 200($i$) can wakeup each other.
10. Sensor data traffic can wakeup nodes towards the path to the C2 node 100; but need not wakeup the entire network.
11. The C2 node may announce shut down of the UGS network.
12. The R nodes are stationary.
13. A Relay R node shown at reference numeral 200(3) in FIG. 1 can be added to extend the battery life of nodes in the UGS network.

The MAC Protocol

The bulk of the traffic is from R nodes 200(1) to 200(N) to the C2 node 100. This skewed traffic route will significantly strain the energy resources of the R nodes near the C2 node 100, making that neighborhood more susceptible to energy depletion and failure. The C2 node 100 has unlimited energy while the relayer R nodes (e.g., R node 200(3)), which do not have sensors, are dedicated to forwarding the sensor data. R nodes 200(1) to 200(N) operate on a limited battery lifetime. Hence, energy efficient protocols at various levels (i.e. physical layer, link layer, network layer, etc.) are extremely critical for the UGS network.

The medium access and neighbor discovery (part of link layer protocol) functions are performed by the DSP 220 and by the link layer function 214 if the GPP 210 in the R nodes. Prudent MAC and neighbor discovery protocols are extremely critical for the energy-aware network design. The method of medium access includes a wake-up signal in case the destination is in sleep mode, Late Net Entry (LNE), if necessary for time synchronization, followed by the normal channel access procedures. The normal channel access is accomplished with the CSMA/CA algorithm.

Sleep and Wake-Up Control

Figure 4:
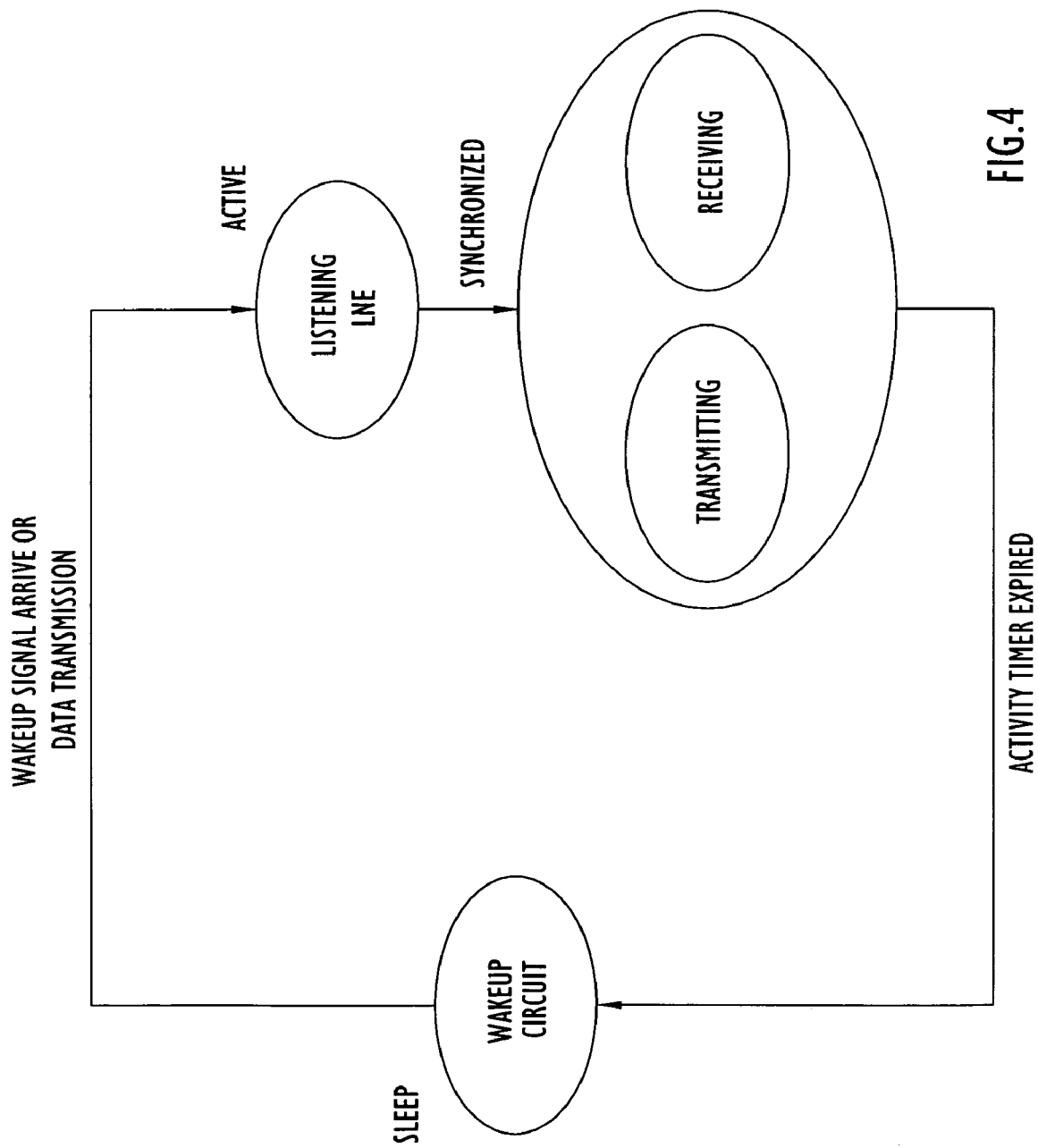
FIG. 4 is a state diagram showing a high level flow of the sensor system shown FIG. 3.

Turning to FIG. 4, with continued reference to FIG. 3, the state transition of an R node between the "sleep" and the "active" state is described. In the "sleep" state the wake-up circuit 228 has a separate, ultra-low power receiver that listens for wake-up signals. When a node enters the sleep state, the antenna input is mechanically switched from the normal receiver 240 to the wake-up circuit 228. There are two types of wake-up schemes in the UGS network sleep mode: (1) host wake-up and (2) RF wake-up. When a local node has information to transmit, while it is in sleep state, then, a host wakeup message is issued to wakeup the local node's DSP 220 and GPP 210 and be ready to form the network before data transmission. The C2 node 100 transmits the C2 wakeup waveform, while R nodes 200(1) to 200(N) transmit the sensor wakeup or rebroadcast the C2 wakeup waveform if the R nodes receive it. The awaken R node transmits the over-the-air (OTA) wakeup signal to its neighbor R nodes. Each R node that receives the OTA wakeup message retransmits that message to its neighbors—called "RF wakeup". Although all nodes may now be awake, they cannot yet communicate because they may not all be in time synchronization. Once wakeup transmission is complete via the wakeup process, the C2 node 100 issues the LNE message (also called the synchronization message) through a LNE channel to synchronize the UGS network and, then, data transmission takes place through the normal channel—in the "active" state.

When a local node does not have any data to transmit or receive in a pre-defined time interval or the activity timer is expired, then the link layer 214 managed by the GPP 210 requests "Sleep Request" to the intranet. If the intranet is not busy, then, it agrees with the DSP to go to the sleep state by sending its response ("ready-to-sleep"). Once the "ready-to-sleep" response is received, the handshaking between DSP 220 and GPP 210 prior to going to sleep ensures that the DSP 220 goes to sleep after the GPP 210 does. If the intranet is busy, then the R node stays in the active state.

Time Synchronization

The use of security features and timeslots make UGS network communications highly dependent upon system clock accuracy. When two nodes are not synchronized in time, they will not normally be able to hear each other's transmissions. Time synchronization drives the selection of timeslots, frequencies, digital spreading codes and TRANSEC codes. Since the availability of GPS as a time reference source is not guaranteed, the UGS network must operate with or without GPS time. Each R node has a real-time clock associated with its modem to drive RF communication. This clock can be synchronized to a variety of sources, modem or internal clock. An R node can optionally have a lower accuracy wake-up circuit clock, which is used to wakeup nodes from power-conserving sleep states.

The LNE message is transmitted on a frequency channel with CDMA spreading codes and TRANSEC based on an LNE period. Therefore, if the internal clocks of two nodes match each other within the coarse LNE period granularity, then either node will be able to hear the other's LNE message. The transmitted LNE signal contains information that will allow the receiving node to synchronize its internal clock with that of the transmitting node to a finer level of granularity. Once time is synchronized between nodes, normal data exchange can take place between the two nodes. LNE operations are designed to permit rapid network formation, while ensuring minimum impact on network components that have already been formed. A node that has not yet discovered any RF Neighbors is called an "Isolated" node, whereas one with neighbors is called an "Associated" node. LNE transmissions for "Associated" nodes do not interfere with normal communication network and data traffic.

The node that sends the LNE message stamps the time at the MAC layer in the message just before putting the packet on the channel. This removes the send time and the access time from the critical path. The receiving node records the time of reception as soon as it starts receiving the packet. This removes the receive time from the critical path to achieve the tight time synchronization.

A major function of the link layer is to collect neighbor information and form what is called a "neighbor table". A neighbor table contains information on all RF neighbors known to the link layer 214 of the GPP 210 in an R node, regardless of link quality, is directly visible only to the GPP 210 and is updated each time a reception from a neighbor occurs. The DSP 220 will attempt to exchange messages, called a Ping-RTS (PRTS) message, with each of the nodes entered in this table. The purpose of these messages is to verify the local nodes' ability to establish, and to maintain, a bi-directional data link with that node. The link layer function of the GPP 214 is solely responsible for determining if a newly discovered node can be considered a viable RF Neighbor. The GPP 210 is also the only processor that can totally delete a neighboring node.

Figure 5:
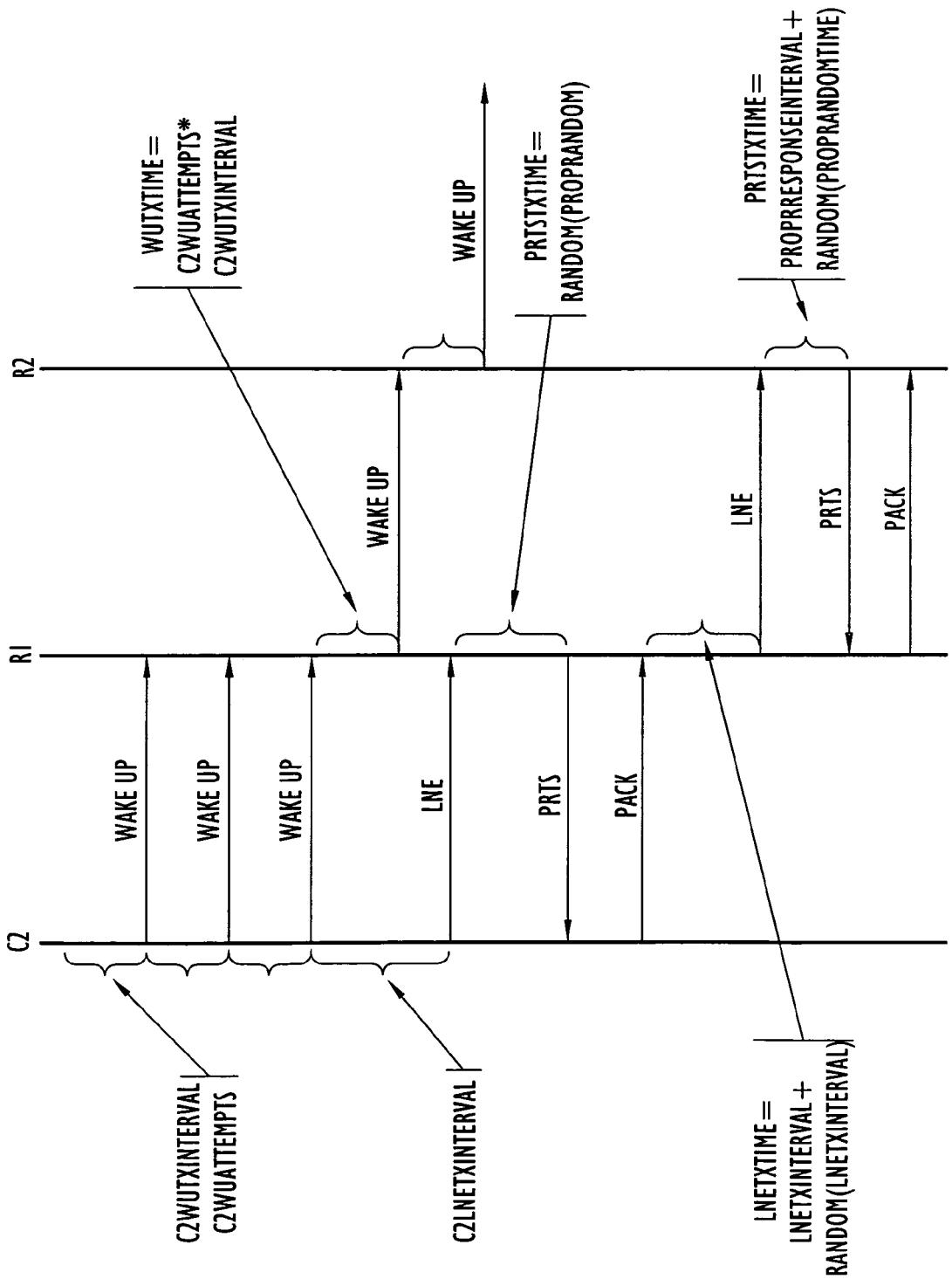
FIG. 5 is a sequence diagram for messages sent according to the medium access control (MAC) techniques described herein for the sensor node network shown in FIG. 3.

The typical timing sequence among these wake-up, LNE and neighbor discovery operations is described by the event sequences shown in FIG. 5. When the C2 node wants to collect sensor information from the sensor fields it initiates the formation of the sensor network by transmitting a C2wake-up signal to wakeup the R nodes that are in sleep state, followed by transmission of an LNE message. Multiple C2wake-up signals can be sent to ensure many neighbors wakeup, prior to transmitting the LNE message. The C2 node is considered in "Associated" mode initially. When an "Isolated" node (R1) hears the wake-up signal (if it is in sleep state), it wakes up its DSP and GPP, rebroadcasts the received C2wake-up message and sets its receiver to listen to the LNE channel in order to synchronize the local clock with the C2 node's clock. Once the LNE message is received, then the "Isolated" node (R1) synchronizes its clock with the C2 node's clock and transmits a PRTS (Ping-RTS) packet to the C2 node. If a PRTS packet is received, the C2 node finds it has a downstream node(s) and sends an acknowledgment (called PACK) back to the sender (R1). Upon receiving a PACK from the C2 node, the downstream node (R1) becomes an "Associated" node and behaves like the upstream node. Now the R1 node transmits an LNE message periodically for other "Isolated" nodes (R2) to join the existing UGS network.

Techniques are described hereinafter that concern how the MAC protocol forms the UGS network efficiently to save the energy and go to sleep when there is no activity. The UGS network stays in sleep state until the C2 node initiates the network wakeup to collect the sensor information from the downstream nodes. The R node wakes up the network when it is in sleep state and has data to send to the C2 node. When the activity timer, running at each R node, is expired, the UGS network goes back to sleep state.

The MAC Algorithms in More Detail

An important aspect of the CSMA technique is a random back off timer that a node uses if it detects a busy medium. If the channel is in use, the node must wait a random period of time before attempting to access the medium again. This ensures that multiple nodes wanting to send data do not transmit at the same time. The random delay causes nodes to wait different periods of time and avoids all of them sensing the medium at exactly the same time, finding the channel idle, transmitting, and colliding with each other. The back off timer significantly reduces the number of collisions and corresponding retransmissions, especially when the number of active users increases. The typical random back-off time in the current design is uniformly distributed among nodes, which contend for access to the channel. This equal opportunity of random back-off is not adequate for the UGS network because the application requirements of the C2 node, relay nodes, and R nodes are quite different in terms of battery life, traffic pattern, system application requirements, etc. We will exploit the application requirements of the UGS network to optimize the MAC and neighbor discovery operations.

Wake-Up Waveform

The C2 node may transmit multiple wakeup signals to make sure that if 1-hop away R nodes miss the first wakeup signal they receive the next one. The number of C2 wake-up attempts (C2WuAttempts) is a configurable parameter and its interval (C2WuTxInterval) is of fixed duration to complete the wake-up RF transmission over the wake-up channel. When an R node in the sleep mode receives a wake-up signal, it waits to rebroadcast it by a random back-off (WuTxTime) time interval to avoid the collision of wake-up signals from neighbors:

$$WuTxTime = C2WuAttemps * C2WuTxInterval + Random(WuTxRandomInterval) \quad (1)$$

The transmission duration (C2WuTxInterval) of a wakeup signal over the wakeup RF channel is generally much longer than those of the normal communication channel. Also, the value of WuTxRandomInterval is set rather large to avoid the collision of wakeup signals from neighbor(s). This large random back-off delay of wake-up signals in equation (1) causes the unnecessary time delay to wakeup the entire UGS network. Once the wake-up signal is received, then a node stops monitoring the wakeup channel and tunes to the LNE channel to receive the LNE messages in order to synchronize its clock with that of the C2 node.

The transmission of multiple wakeup signals does not improve the probability of detection and false alarm with the conventional wakeup circuit. Rather, the C2 node, which has unlimited battery life, transmits one wake-up signal immediately because no collision of wake-up signals occurs in the UGS network when the C2 node initiates network formation. The wakeup signal, transmitted by the C2 node, may employ an increased process gain, if low probability of intercept and low probability of detection (LPI/LPD) is involved. Increased process gain of the wake-up signal may be achieved by one or more of: a greater bandwidth, slower bit rate and higher chip rate (in the case of spread spectrum signals) in order to make the wake-up signal more likely to be detected by R nodes. All nodes, even if they are in a sleep state, are monitoring the wakeup channel for signals. The objective of the this algorithm is that the C2 node wakes up neighbors (R nodes) within the increased range immediately and makes them ready to synchronize their clocks with that of the C2 node. The R node, receiving the C2 wakeup signal, rebroadcasts it prior to switching its antenna to LNE channel by:

$$WuTxTime=C2WuTxInterval+Random(WuTxRandom\text{-}Interval) \quad (2)$$

Figure 6B:
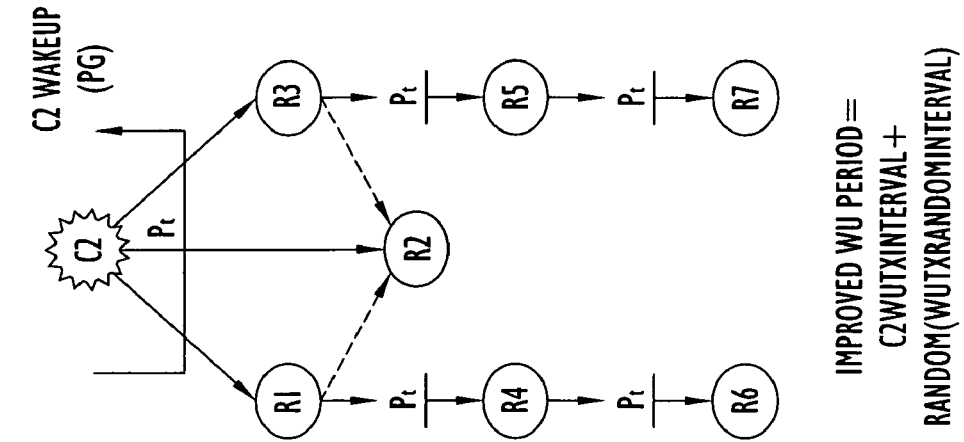
FIG. 6B is a flow diagram of a power efficient wake-up routine.
Figure 6A:
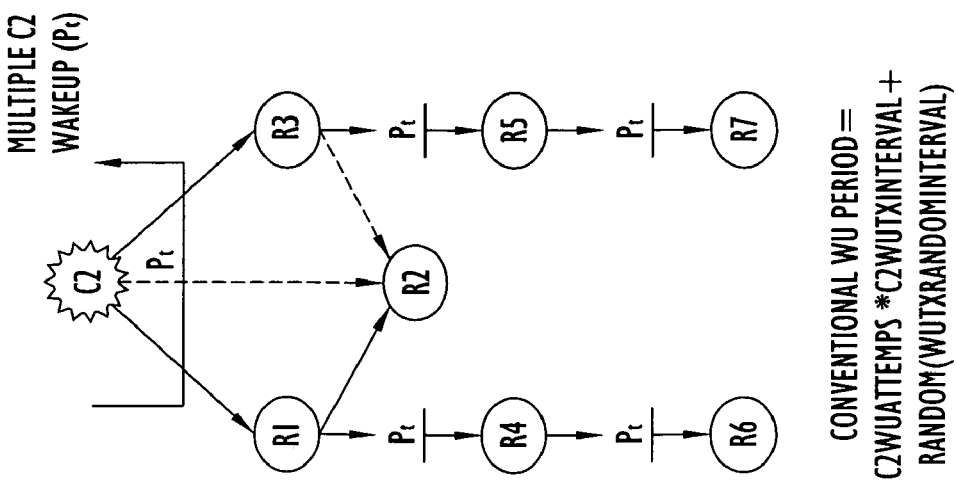
FIG. 6A is a flow diagram of a prior art wake-up routine.

The 7 R-node UGS network shown in FIG. 6A illustrates the prior art approach of the wakeup waveform design. Assuming the R2 node is located between nodes R1 and R3 and is out of range of the C2 node's transmit power, the R2 node must wait until the R1 or R3 node rebroadcasts the C2 wakeup waveform. For example, using the conventional approach, when the C2 node transmits the wakeup signal to form the UGS network, while the R1 and R3 are in the "Associated" status, they cannot rebroadcast the C2 wakeup signal to the "Isolated" R2 node. Since multiple C2 wakeup signals cannot overcome the R2 wakeup in this scenario, an increased process gain (PG) approach is provided in the C2 wakeup waveform, as shown in FIG. 6B, without the degradation of LPI/LPD feature. The wakeup scenario shown in FIG. 6B by the C2 node improves the probability of detection ($P_d$) of the wakeup signal. This can reduce the propagation time delays to wakeup the network by $$NumHopsToC2*\{C2WuAttemps*C2WuTxInterval+Random(WuTxRandomInterval)\} \quad (3)$$

To summarize, a method of waking up nodes in a wireless communication network is provided comprising: transmitting a single wake-up signal by a first node with at least one parameter that increases the range of the wake-up signal; receiving the wake-up signal from the first node at at least a second node, and in response thereto, the second node entering a wake-up state; and in response to the second node entering the wake-up state, rebroadcasting the wake-up signal to wake-up other nodes prior to the second node switching to a higher power consumption receiver to receive a synchronization message. The parameter used to transmit the single wake-up signal may be one or more of a bit rate (lower bit rate), bandwidth, and chip rate (higher chip rate for spread spectrum modulation), that increases the processing gain of the wake-up signal.

Wakeup Boundary Issue

The wakeup signal, or symbol, may be composed of a pseudo-noise (PN) sequence to comply with LPD/LPI requirements, and also an anti-jamming (AJ) requirement. The configurable PN sequence of bits ($S_i$ i=1, ..., n) and frequency channel ($F_i$ i=1, ..., n) are chosen and stored for the mission duration. The transmitter selects the PN sequence ($S_j$) at the beginning of the wakeup epoch (j) and transmits this wakeup signal at the selected channel ($F_j$). If a node's receiver clock differs around the epoch boundary from that of the transmitter, then the receiver misses the wakeup signal completely. To solve this boundary problem, the conventional approach transmits the current PN sequence ($S_j$) at channel ($F_j$) followed by the next PN sequence ($S_{j+1}$) at channel ($F_{j+1}$). Thus, the receiver can receive either the $S_j$ or $S_{j+1}$ signal. Again, this approach does not improve the probability of detection ($P_d$) or false alarm rate ($P_{fa}$). A better approach is to combine two PN sequences ($S_j$ and $S_{j+1}$) into a single signal transmitted at channel ($F_j$). Said another way, the single wake-up signal is formed by combining at least two PN sequences and transmitting the single wake-up signal at a frequency channel related a first of the PN sequences. The receiver can detect the $S_j$ or $S_{j+1}$ signal, or both. This latter approach solves the boundary problem and improves the $P_d$ and $P_{fa}$ over the conventional one without degradation of AJ/LPI/LPD.

LNE (Synchronization) Message Waveform

This method is simple and useful if the required synchronization is peer-to-peer within the broadcast domain of a single node. In the LNE mode, all nodes within the network use the fixed TRANSEC. This permits all nodes within the network to listen to the LNE messages without initial time reference. Upon receiving a LNE message, a node extracts the transmitter time and uses it to update its own time. The LNE signal is transmitted at the same power and data rate as the RTS. A LNE message contains the following information: Sender's Local Clock, Source Node ID, C2 node Address, Number of Hops To C2 node, Battery Life Index and Cost To C2 node.

When a C2 node exists in the UGS network, all nodes know the C2address by reading the LNE message. Also, other local node's information (number of hops to the C2 node, cost to the C2 node and battery life index) is provided through the neighbor discovery process. The neighbor discovery protocol (of the link layer) allows that the MAC protocol listens for LNE(s) in a pre-defined period (LneListenTime). After this timer is expired, the MAC protocol stops to monitor the LNE channel and begins to monitor the reservation channel for normal communication. The best LNE source based on the LNE information is selected and the inquiry process starts to find the best upstream node. Listening to the LNE channel requires unnecessary energy use up to the end of the timer (LneListenTime) because the receiver must monitor the channel, even if there is only one LNE or the best one is already received. Consequently, the following process is provided to avoid this rather long and wasteful LNE listening period: the best upstream node generates the more and faster LNE signals than the lesser nodes to enhance the probability of reception. In this way, the OTA transmitted by the LNE(s) is controlled by each node's status. This optimized LNE transmission produces the fast reception of the best LNE source.

A description of "conventional" time synchronization for the tactical network follows. An "Isolated" node will devote all of its resources to the task of discovering, and synchronizing time with an RF neighbor. To do this, an "Associated" node will issue LNE signals at a relatively low rate. However, since all "Associated" nodes will be issuing LNE messages independently, an "Isolated" node will quickly detect a LNE signal, despite that individual "Associated" nodes are issuing these messages at a lower rate. This LNE message can be detected by "Isolated" nodes which will then synchronize with the "Associated" nodes. The conventional LNE transmission periods are randomized by $$LneXmtTime=0.5*LneXmtInterval+Random(LneXmtInterval) \quad (3)$$

The LNE algorithm waits for an LneXmtInterval interval to provide time during which external nodes may respond to the LNE message. This interval is randomized over a configurable time range of LneXmtInterval. This conventional time synchronization, equation (3), is not adequate to the UGS network because all nodes have an equal opportunity of medium access.

In UGS time synchronization, an "Isolated" node does not transmit the LNE message unless it achieves "Associated" status. As soon as the C2 node needs to form the network, it declares itself an "Associated" node and starts to transmit the LNE message to find if there is an R node in the UGS network. Using the conventional synchronization approach, a node that is far from the C2 node must wait a long time to receive the LNE message because the implementation of equation (3) assumes that all "Isolated" nodes have equal opportunity to synchronize with the "Associated" nodes. The unique application requirement of the UGS network must be built into the time synchronization process. The C2 node leaves the network anytime and initiates to form the network anywhere, while the R nodes in the network are stationary. Also the C2 node has no shortage of battery power and maintains the better communication link due to its better antenna exposure. The R nodes have a limited battery life and may have connectivity impairments with each other in a tactical environment. This includes frequent network topology changes, network partitions, and radio characteristic changes (i.e., role, battery level, sleep or active state). The application requirements are to be accounted for in the LNE transmission rate so that time synchronization is achieved as soon as possible in a UGS network. This optimized LNE transmission period of a given node makes the reception of LNE by an "Isolated" node faster and, therefore, consumes less energy.

The C2 node transmits the LNE periodically. Because the C2 node initiates the LNE message in the UGS network, it transmits the first LNE message immediately without collision after waiting a very short time to transmit (C2WaitSetUpTime).

First LNE message:

$$C2LneXmtTime=C2WaitSetUpTime \quad (4)$$

Following LNE messages:

$$C2LneXmtTime=C2LneXmtInterval+Random(C2LneXmtInterval) \quad (5)$$

The configurable time range of C2LneXmtInterval is set much smaller than LneXmtInterval in equation (3) so that as many 1-hop away R nodes are synchronized with the C2 node much faster.

The periodic LNE message transmission rates at each node are formulated by $$LneXmtTime=A_1*LneHop\ Interval+A_2*BatteryLifeInterval+A_3*LneCountInterval+random(LneXmtinterval) \quad (6)$$

where $A_1$=number of hops to C2/maximum number of hops to C2
$A_2$=remaining battery/maximum battery
$A_3$=LNE message count starting from 0.

The first weighting factor ($A_1$) in equation (6) implies that R nodes, nearer to the C2 node, generate more frequent LNE messages than R nodes that are farther away. The second ($A_2$) term guarantees that R nodes with stronger battery power generate more LNE messages so that those R nodes become the upstream nodes over those R nodes with relatively weaker battery power. For example, if a node has extremely low battery (or less than a remaining battery threshold), then it sets this weight factor very large so this node cannot be a LNE message source and avoids being an upstream R node. The sequence number of LNE message generated ($A_3$) is included in the LNE period because the probability of LNE message being received by an "Isolated" node becomes less likely when the LNE message sequence number increases. An "Isolated" node generates far less or stops transmitting LNE messages when this sequence number is greater than the predefined threshold. These configurable weight factors ($A_1$, $A_2$, $A_3$) and their base-timers (LneHopInterval, BatteryLifeInterval, LneCountInterval, LneXmtInterval) in equation (6) must be optimized for the UGS network. The ideal time synchronization minimizes energy use by providing service that is exactly necessary and sufficient for the needs of the application. The configurable parameters in equation (6) can allow synchronization to be matched more closely to the requirements of the UGS application.

Figure 7B:
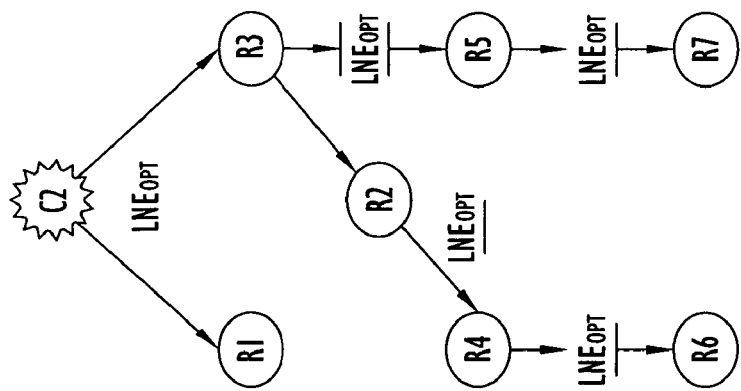
FIG. 7B is a flow diagram of a power efficient node synchronization routine.
Figure 7A:
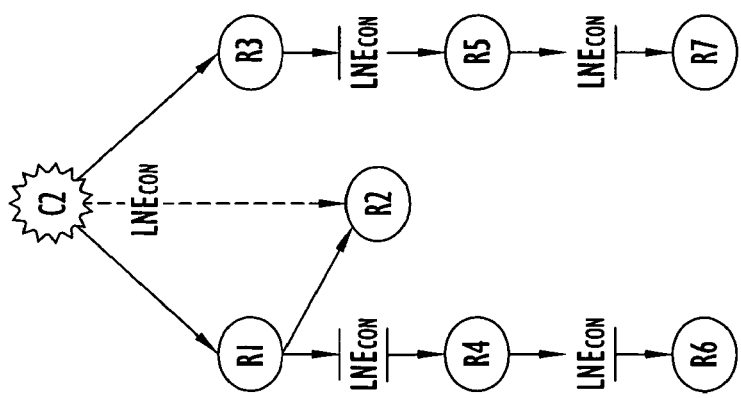
FIG. 7A is a flow diagram of a prior art node synchronization routine.

As described above, the optimized LNE period can yield a faster time-synchronization than the conventional one shown in FIG. 7A. The conventional LNE is generated after each R node's wake-up in a uniformly distributed fashion. In the conventional approach, the first R1 node's LNE message is received by R2 before R3's LNE message arrival to illustrate the improvement of the optimized approach shown in FIG. 7B. It is assumed, for purposes of this example, that R1 has lower battery power than R3. R2 node selects R3 node as the upstream node and attempts to form the bi-directional link (neighbor discovery). In the optimized MAC approach shown in FIG. 7B, R3 generates a faster LNE message than R1 does by the proposed formula and this prevents the weak node(s) from serving upstream transmissions.

To summarize, a method of synchronizing nodes in a communication network is provided comprising adaptively selecting a transmission rate at which synchronization messages are to be transmitted from a synchronized node, the transmission rate being selected as a function of one or more factors including: a number of node hops between the synchronized node and a certain node; a remaining available power level of the synchronized node; and a number of synchronization message previously transmitted by the synchronized node in a current network synchronization sequence; and transmitting synchronization messages from the synchronized node to other nodes in the communication network according to the selected transmission rate. Moreover, a particular node serves as an upstream node through which data from other nodes is transmitted for retransmission to the master node based on the one or more factors associated with the particular node.

PRTS Waveform

No neighbor discovery operation can take place until the local node has completed its time synchronization operation via the LNE process. Once the node has completed time synchronization, it will begin to issue PRTS messages in order to identify those RF neighbors with which successful bi-directional communication can be established.

The generation of PRTSs is an independent process that is automatically performed by the link layer (LL) protocol after time synchronization has been completed. FIG. 5 shows the flow of a PRTS message in order to find the RF neighbor. Upon completing time synchronization, the LL delays for a random time interval and sends the PRTS message as broadcast over the reservation channel. The transmit interval of PRTS (PrtsXmtTime) is randomized by First PRTS:

$$PrtsXmtTime = random(PrtsXmtInterval) \qquad (7)$$

Following PRTS:

$$PrtsXmtTime = PrtsResponseInterval + random(PrtsXmtInterval) \qquad (8)$$

The LL waits a PrtsResponseInterval interval in order to provide time during which remote nodes may respond to the PRTS. This interval is randomized over a configurable time range of PrtsXmtInterval. When an "Associated" node (or upstream node) receives the PRTS message, it knows that there are downstream node(s) to join the network. It sends an acknowledgement called a PACK. Once the PACK is received, then an "Isolated" node becomes an "Associated" one, terminating the PRPS process and starting to transmit the LNE message periodically. If no PACK is received from the upstream node and the PrtsXmtTime timer expires, a new PRTS message is issued until NumberPrtsTries have been issued. If NumberPrtsTries is over, the local node then ceases to issue PRTSs until PROPHoldOff seconds have elapsed and then declares the node as still being "Isolated"—LNE failure. Then, the LL protocol is waiting for the next command from the intranet.

The application requirements of the UGS network apply, also, to the generation of the PRTS messages. Because the PRTS message(s) are broadcasted in the reservation channel, the 1-hop away nodes can hear other PRTS messages generated by the neighbor(s). A node with the stronger battery life is preferred to request the PRTS to the upstream node. That is, the node with stronger battery life has priority over those with weaker battery life.

First PRTS:

$$PrtsXmTime = A_1 * BatteryLifeInterval + random(PrtsXmtInterval) \qquad (9)$$

Following PRTS:

$$PrtsXmtTime = PrtsResponseInterval + random(PrtsXmtInterval) \qquad (10)$$

A method of performing discovery of nodes in a wireless communication network in order for two nodes to have bi-directional communication, comprising determining a level of remaining available power at a node in the wireless communication network; selecting a transmission rate at which to transmit node discovery messages from the node as a function of the level of remaining available power; and transmitting node discovery messages from the node according to the selected transmission rate. The node discovery message may be a RTS message that is intended to solicit and acknowledgment message from a node that receives it. When a node receives the node discovery message from another node, it knows that the node that transmitted the node discovery message is a downstream node that wishes to join the wireless network. When the node that transmitted the node discovery message receives the acknowledgment message, it joins the wireless network by transmitting a synchronization message to other nodes in the network.

Performance Analysis

The typical 7-nodes scenario, as shown in FIG. 7B, is selected to illustrate the performance analysis. The 7-node UGS network is in the sleep state at the beginning and the C2 node commands the network formation: (1) the C2 node transmits the C2 wakeup signal, (2) followed by the LNE for time synchronization and (3) PRTS query process to form a bi-directional link. The reception of a PACK is not included in the latency computation because its delay is negligible. The latency is defined by how long time it takes for an "Isolated" node to become an "Associated one". The goal of this analysis is to determine: (1) how fast the UGS network is formed after being initiated by the C2 node and (2) minimize the number of OTA message transmission.

Example Scenario

Figure 8B:
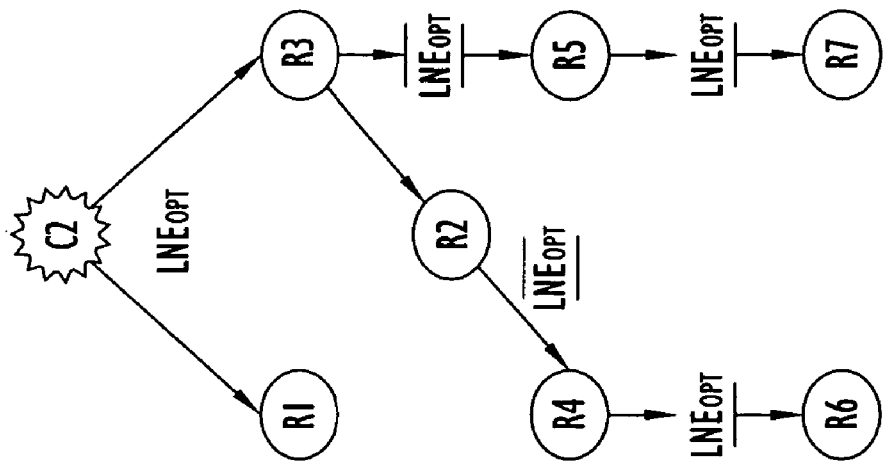
FIG. 8B is a flow diagram showing how the MAC procedures described herein deal with a node having a dead battery.

In this example, it is assumed that the R3 node has a higher battery power than the R1 node. The efficiency and robustness of the MAC protocol is compared against the conventional approach for the UGS network. All other nodes, except nodes R1 and R3, are assumed to have equal battery power for simplicity of the analysis. According to the conventional MAC protocol, node R1 receives the wakeup signal from the C2 node, which it rebroadcasts to nodes R2 and R4. More bits in the wakeup signal from the C2 node increase the process gain (PG), thereby increasing the probability to reach node R2. For example, two conventional C2bit patterns (each 512 bits) may be combined to make the C2waveform (1024 bits) and the wakeup detector is integrated and summed to improve the full process gain of 3 dB. After node R2 is awake, it switches the antenna to listen to any LNE message as shown in FIG. 8B. The received LNE(s) at node R2 could be generated from nodes R1 or R3. The improved MAC protocol determines the desirable node, in terms of the energy usage, to be the upstream node.

Figure 8A:
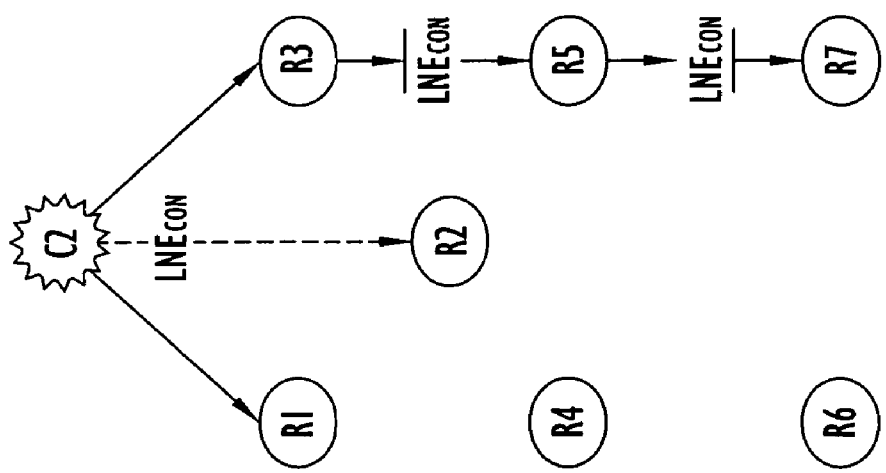
FIG. 8A is a flow diagram showing how a node with a dead battery affects other nodes in the network using prior art techniques.

When the battery power of the R1 node becomes low or gets below the threshold, with the conventional approach, downstream nodes (R4 and R6) are still getting the time synchronization from R1 thereby draining R1's battery further as shown in FIG. 8A. In the improved MAC protocol, node R2 selects node R3 (which has strong battery power) as the upstream node, as shown in FIG. 8B. Exemplary values for C2WuAttemps and LneXmtInterval are 2 and 3 seconds, respectively. In the improved MAC protocol, R3 generates the LNE message faster than R1 so that R2 synchronizes with R3, while with the conventional approach R2 synchronizes with R1.

When the battery power of the R1 node is drained out, then with the conventional approach the downstream nodes (R4 and R6) are isolated or fragmented from the rest of UGS network because nodes R4 and R6 may still consider the dead node R1 as the upstream node. In the improved MAC protocol, R2 node selects R3 node (which has strong battery power) as the upstream node. R1 is the only one "Isolated", while nodes R4 and R6 are still attached to R2, as shown in FIG. 8B.

When the C2 node initiates the re-organization or re-formation of the network after node R1's failure, the UGS network with the conventional approach may or may not achieve the same topology as would be achieved with the improved MAC protocol.

Latency Estimate

Figure 9:
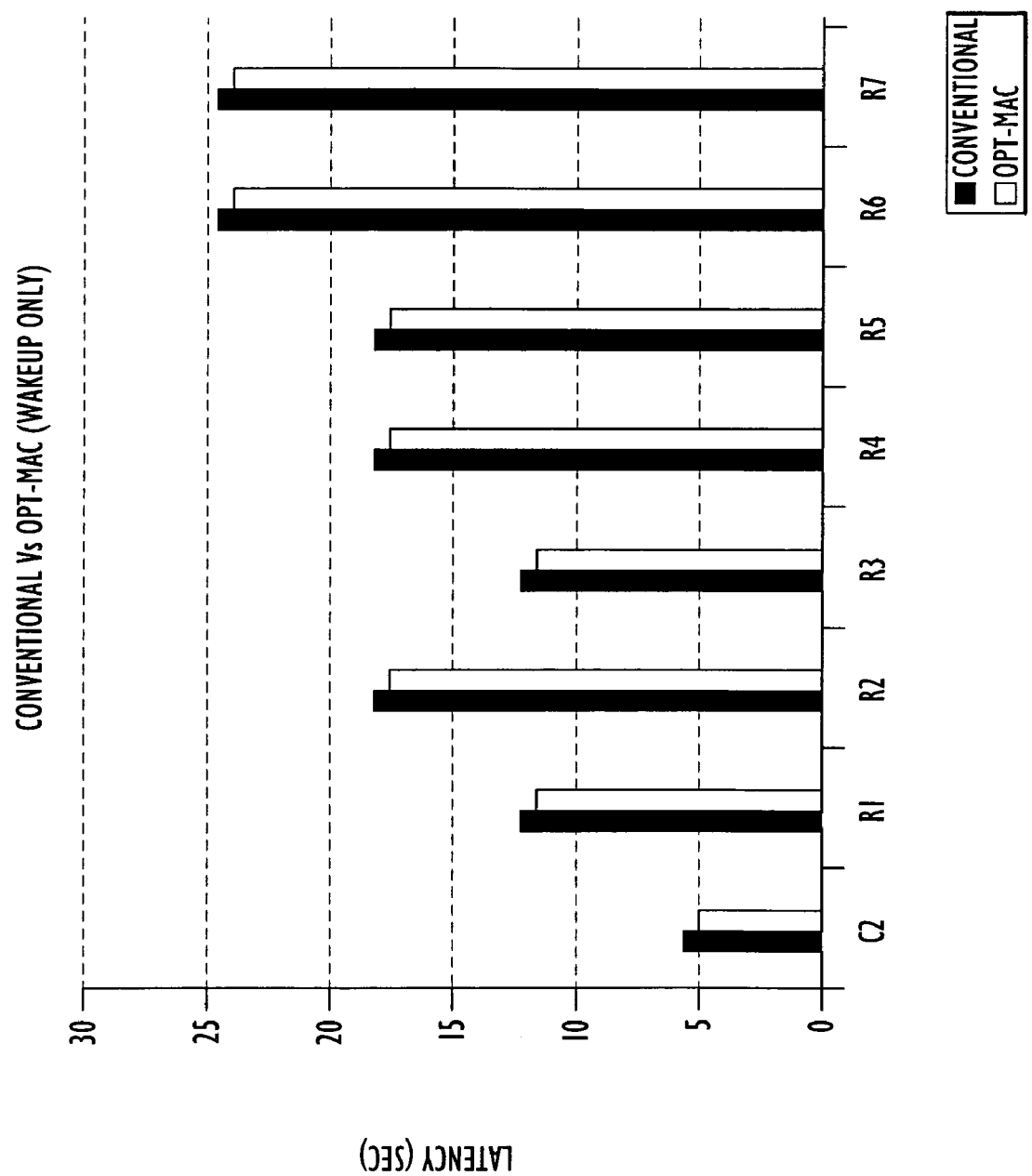
FIG. 9 is a chart comparing wake-up latency of prior art MAC techniques with the MAC techniques described herein.

The C2 node wakeup bit-pattern (512 bits) is transmitted twice (at 40 Kbps) for the conventional protocol and the proposed C2 wakeup (1024 bits) is transmitted (also, at 40 Kbps) immediately after the identical transmitter set-up time delay. The transmitter set-up time is 12 msec and the random delay WuRandomInterval is 2 seconds for both protocols. FIG. 9 presents the latency comparison between the conventional MAC protocol and the improved MAC protocol, assuming that only the improved C2 wakeup signal is applied and the LNE and PRTS algorithms are the same for both. The latency is shortened by 1.1 seconds and this is propagated throughout the UGS network. The multiple-C2-wakeup-signal transmission does not improve the probability of detection and false alarm rate. The improved PG C2transmission is more desirable because it reaches farther nodes and does not degrade the LPI/LPD feature.

However, the improvement achieved by the improved MAC protocol in other scenarios is more significant. Identical parameter values are used to compare the performance. The LneXmtInterval (3 seconds) in the conventional LNE is distributed equally (1 second each) among the three intervals in the improved MAC LNE equation (6) (LneHopInterval, BatteryLifeInterval and LneCountInterval). The LNE transmission period for the improved MAC is computed from:

$$LneXmtTime=\{\text{number-of-hops-to-}C2/\text{MaximumHops}\}*LneHopInterval+\{\text{Maximum-BatteryIndex/local-battery-index}\}*BatteryLifeInterval+lne\text{-}pkt\text{-}count*LneCountInterval+random(LneXmtInterval) \quad (6)$$

where

MaximumHops=4; MaximumBatteryIndex=15; lne-pkt-count=1

Figure 10:
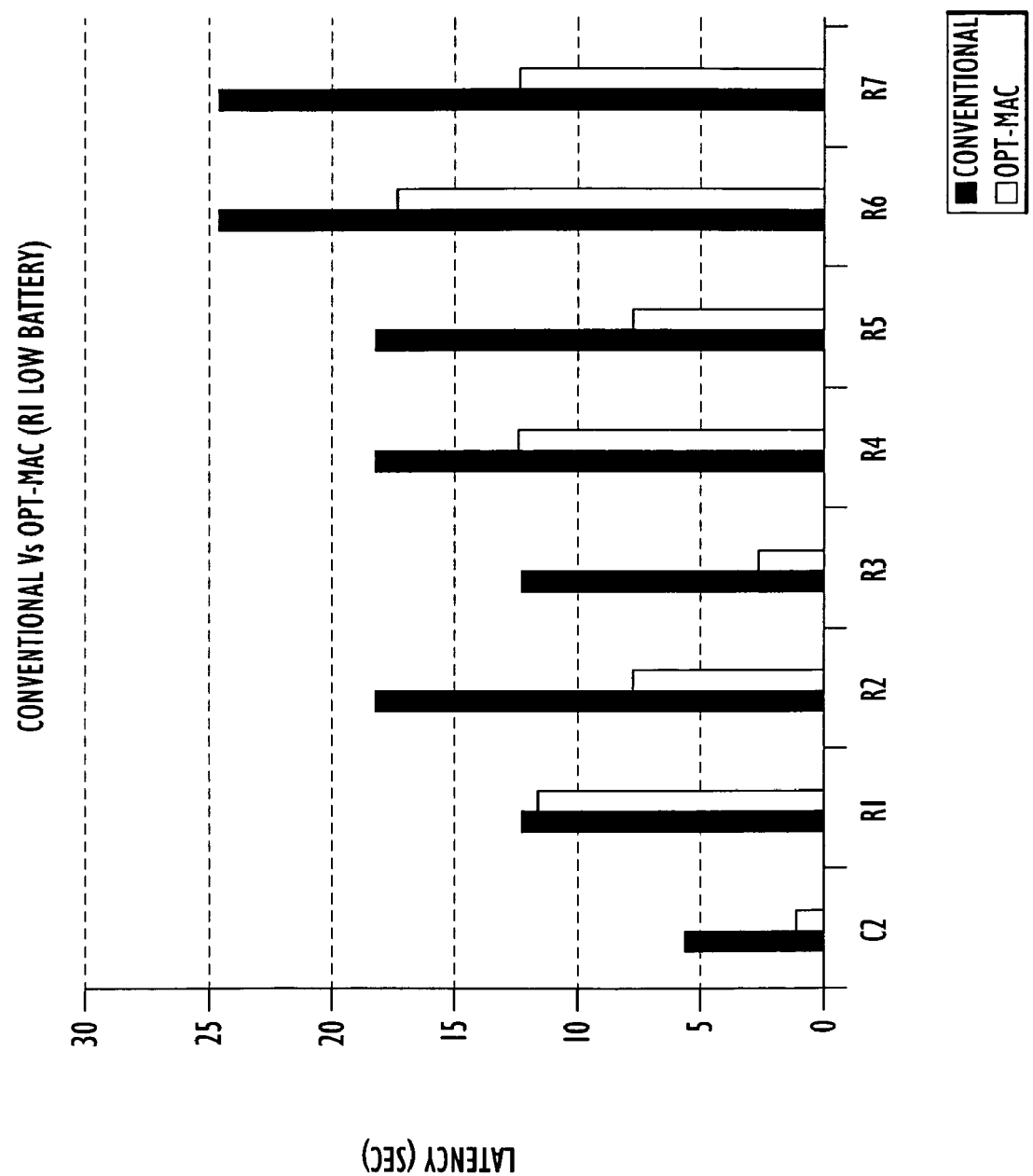
FIG. 10 is a chart comparing latency for a low battery node case for prior art MAC techniques with the MAC techniques described herein.
Figure 11:
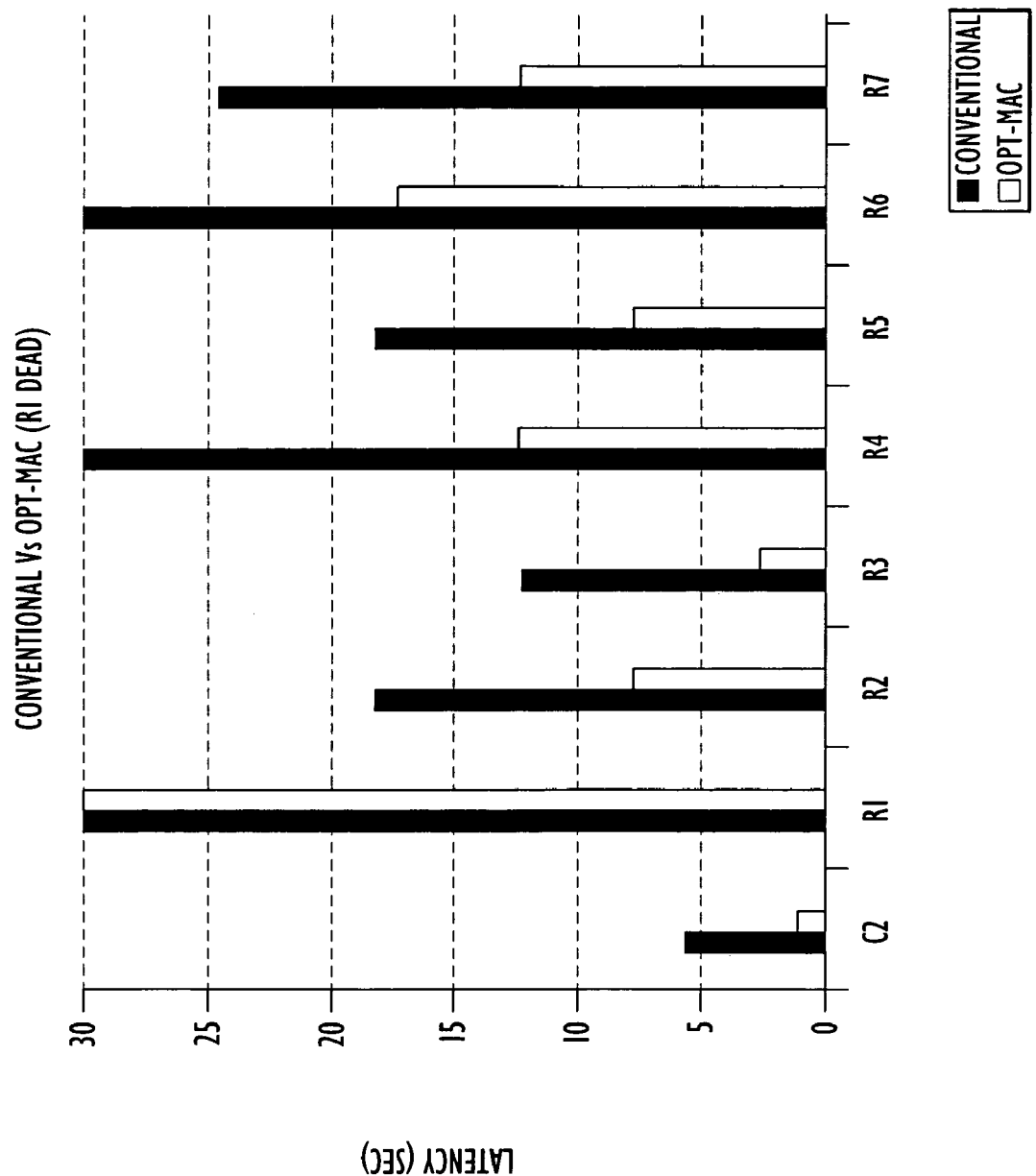
FIG. 11 is a chart comparing latency for a dead battery node case for prior art MAC techniques with the MAC techniques described herein.

FIGS. 10 and 11 present the latency comparison for the R1 node low battery and dead battery cases. Node R1's battery index is set to 5 (low battery case) and 0 (dead case) and node R3's is set to 15 (maximum index), while others are set to 10. FIG. 10 presents the latency of the conventional protocol against that of the improved MAC protocol. Nodes R4 and R6 in the conventional case are "Isolated", but, they are downstream nodes in the Opt-MAC protocol case, as expected. The overall performance of the improved MAC is superior to that of the conventional approach.

OTA Messages

Figure 12:
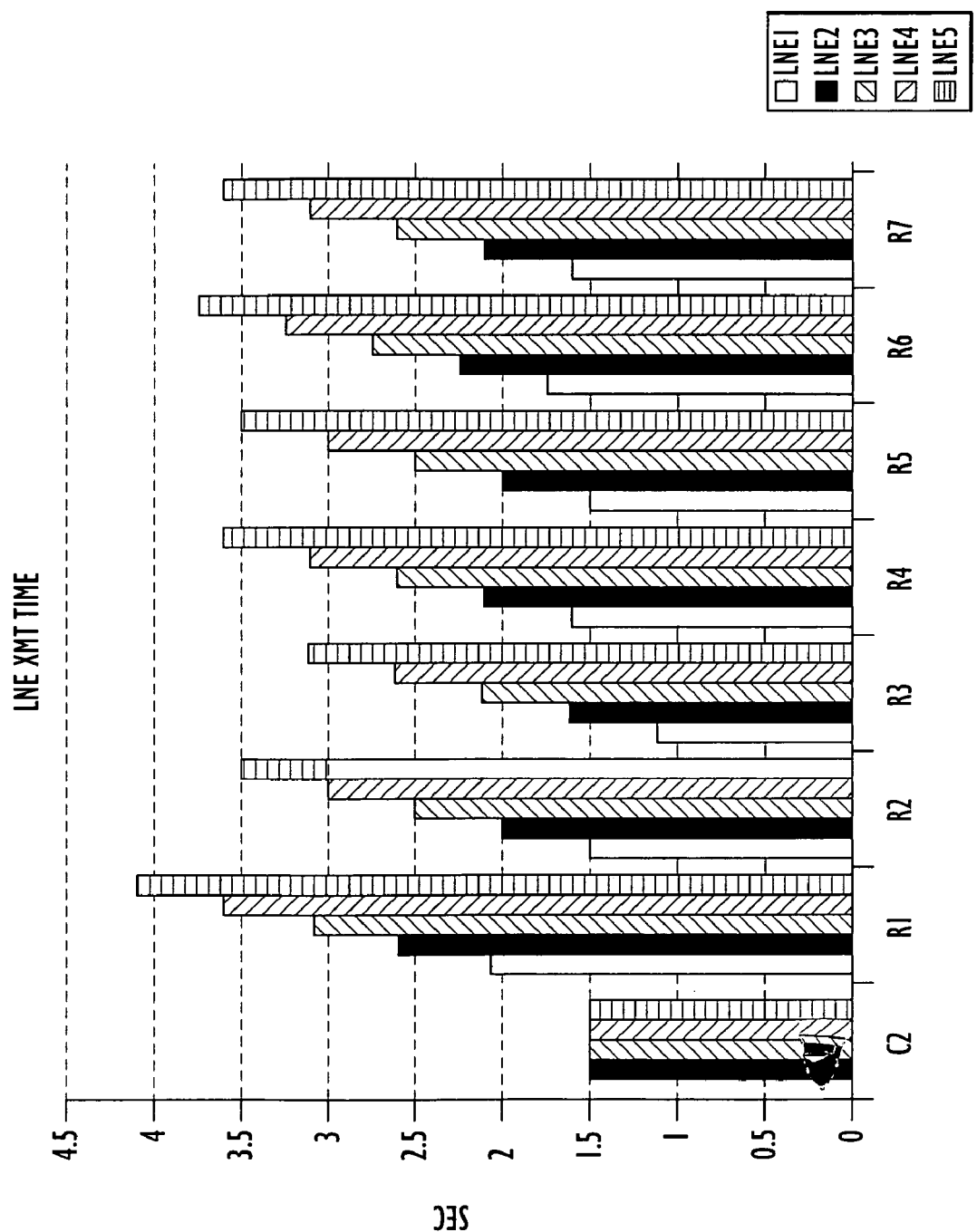
FIG. 12 is a chart comparing synchronization time periods for prior art MAC techniques with the MAC techniques described herein.

FIG. 12 presents the LNE message transmit period for nth messages. The conventional LNE message is transmitted every 3 seconds continuously, while the improved MAC transmits the LNE message slower when the LNE message sequence increases. The first two LNE messages are transmitted much faster than in the conventional approach and the later LNE messages are generated at a much slower rate. One unique aspect is controlling the LNE message transmit time at any rate while not degrading the latency. For example, when a node is very low in battery power, it stops transmitting its LNE message to avoid being the upstream node. If the first several LNE messages can not be received by the "Isolated" nodes, then it is a waste of energy to keep transmitting the LNE in the UGS network. When a network is needed to form or re-form, the C2 node initiates the wakeup procedure and commands the network formation. Then the "Isolated" nodes, which could not connect to the network, can then join the network.

In summary, an application requirements-based energy-efficient MAC protocol is provided. Unlike conventional MAC protocols that treat all nodes equally with respect to energy conservation, the MAC protocol described herein is based on the critical UGS application requirements of sensor nodes. The application requirements of a sensor node could be based purely on local node information, such as number of hops to the C2 node, relative current battery life level, and LNE message sequence number. Because the UGS network is formed during the first few LNE messages, the LNE message sequence number is included in the formula to control unnecessary OTA transmission. The "Isolated" node with the best LNE s message source within the neighborhood declares itself as soon as possible as the next "Associated" node at the end of RF neighbor discovery. The advantage behind this approach is the reduction of the idle listening time thereby reducing energy of the critical "Isolated" nodes in the process of transitioning to the "Associated" status. Thus, nodes can go to sleep fast when they have nothing to transmit.

The MAC protocol has been described herein for reduction of the idle time and the OTA traffic of a UGS network, but it should be understood that it is also applicable to other sensor networks that employ a tree-like topology. For example, it is applicable to a military or civilian ad-hoc sensor networks in general or any sensor network involving airborne, ship-based, as well as mixed ground-based/airborne/ship-based network configurations.

The system and methods described herein may be embodied in other specific forms without departing from the spirit or essential characteristics thereof. The foregoing embodiments are therefore to be considered in all respects illustrative and not meant to be limiting.

What is claimed is:

1. A method of waking up sensor nodes in a wireless mobile ad hoc sensor network, comprising:
   a. initiating formation of a wireless mobile ad hoc sensor network by wirelessly broadcasting a single wake-up signal one time by a first sensor node with at least one parameter that increases a processing gain of the wake-up signal to make it more likely to be received by other sensor nodes which prior to reception of the wake-up signal in an isolated state unaware of other sensors nodes or the existence of a network;
   b. receiving the wake-up signal from the first sensor node at at least a second sensor node, and in response thereto, the second node entering a wake-up state; and
   c. in response to the second node entering the wake-up state, said second sensor node rebroadcasting the wake-up signal to wake-up other isolated sensor nodes prior to the second sensor node switching to a higher power consumption receiver to receive a synchronization message from the first sensor node.

2. The method of claim 1, and further comprising delaying rebroadcasting of the wake-up signal by a period of time substantially equal to a sum of a transmission duration of the wake-up signal transmitted by the first node and random period of time.

3. The method of claim 2, wherein receiving comprises receiving the wake-up signal at a plurality of remote sensor nodes that are in an isolated state, each of which, in response thereto, enters a wake-up state, and rebroadcasts the wake-up signal to wake-up other remote sensor nodes that are in an isolated state.

4. The method of claim 1, wherein wirelessly broadcasting comprises transmitting the single wake-up signal with the at least one parameter that comprises one or more of a bit rate, chip rate and bandwidth, to increase the processing gain of the wake-up signal.

5. The method of claim 1, wherein wirelessly broadcasting comprises transmitting the single wake-up signal from the first node that is not power source limited.

6. The method of claim 1, wherein wirelessly broadcasting the single wake-up signal from the first sensor node comprises combining at least two pseudo-noise (PN) sequences into the single wake-up signal and transmitting the single wake-up signal at a frequency channel related to a first of the PN sequences.

7. A method for synchronizing nodes that have been placed in a wake-up state according to the method of claim 1, comprising transmitting synchronization messages from a synchronized sensor node to other sensor nodes that are not synchronized, wherein transmitting comprises transmitting the synchronization messages at a periodic transmission rate that is based on one or more factors including: and a number of node hops between a synchronized node and a certain node; a remaining available power level of the synchronized node; and a number of a synchronization message previously transmitted by the synchronized node in a current network synchronization sequence.

8. The method of claim 7, wherein a particular sensor node serves as an upstream sensor node through which data from other sensor nodes is transmitted for retransmission to master node based on the one or more factors associated with the particular sensor node.

9. The method of claim 8, wherein transmitting comprises transmitting the synchronization message from the particular sensor node at a faster periodic transmission rate than would be transmitted by other sensor nodes.

10. A method of discovering nodes in the wireless communication network that have been synchronized according to the method of claim 7, comprising:
   a. determining a level of remaining available power at a particular sensor node;
   b. selecting a transmission rate at which to transmit node discovery messages from the particular sensor node as a function of the level of remaining available power; and
   c. transmitting node discovery messages from the sensor node according to the selected transmission rate.

11. The method of claim 10, wherein transmitting node discovery messages comprises transmitting request-to-send (RTS) messages to other nodes in expectation of receiving an acknowledgment message from a node that receives it.

12. The method of claim 11, and further comprising receiving the node discovery messages at a particular sensor node and in response transmitting the acknowledgment message, wherein the particular sensor node that receives the node discovery message knows that the node that transmitted the node discovery message is a downstream node that wishes to join the wireless communication network.

13. The method of claim 12, and further comprising, in response to receiving the acknowledgment message, the node that transmitted the node discovery message joining the wireless communication network by transmitting a synchronization message to other nodes in the wireless communication network.

14. A moble ad hoc wireless sensor network comprising:
   a. a central node that wirelessly broadcasts a single wake-up signal one time with at least one parameter that increases the processing gain of the wake-up signal to make the single wake-up signal more likely to be detected by other sensor nodes when said central sensor node initiates formation of a moble ad hoc wireless sensor network; and
   b. a plurality of remote nodes that collect data and transmit the data to the central node, wherein when a remote node receives the wake-up signal from the central node it enters a wake-up state from an isolated state when it is unaware of other sensor nodes of the existence of a network and rebroadcasts the wake-up signal to wake-up other isolated sensor nodes prior to switching to a higher power consumption receiver to receive a synchronization message.

15. The wireless communication network of claim 14, wherein the centralsensor node transmits the single wake-up signal with one or more of a bit rate, bandwidth, chip rate that increases the processing gain of the wake-up signal.

16. The wireless communication network of claim 15, wherein the central node combines at least two pseudo-noise (PN) sequences into the single wake-up signal and transmits the single wake-up signal at a frequency channel related to a first of the PN sequences.

17. The wireless communication network of claim 14, wherein the remote nodes adaptively select a transmission rate at which synchronization messages are to be transmitted to other nodes, the transmission rate being selected as a function of one or more factors including: a number of node hops between the remote sensor node and the central sensor node; a remaining available power level of the remote node; and a number of synchronization message previously transmitted by the remote sensor node in a current network synchronization sequence.

18. The wireless communication network of claim 17, wherein a particular remote node serves as an upstream sensor node through which data from other remote nodes is transmitted for retransmission to the central sensor node based on the one or more factors associated with the particular remote node.

19. The wireless communication network of claim 14, wherein a remote node discovers other remote nodes in the wireless communication network by determining a level of its remaining available power; selecting a transmission rate at which to transmit node discovery messages as a function of the level of remaining available power; and transmitting node discovery messages according to the selected transmission rate.

* * * * *

UNITED STATES PATENT AND TRADEMARK OFFICE
CERTIFICATE OF CORRECTION

PATENT NO. : 7,496,059 B2  Page 1 of 1
APPLICATION NO. : 11/007259
DATED : February 24, 2009
INVENTOR(S) : Chang-June C. J. Yoon It is certified that error appears in the above-identified patent and that said Letters Patent is hereby corrected as shown below:

Column 16, line 27, replace "second node" with -- second sensor node --;
line 52, replace "first node" with -- first sensor node --;
line 65, replace "including: and a" with -- including: a --;
Column 17, line 6, replace "to master" with -- to a master --;
line 22, replace "the sensor" with -- the particular sensor --;
line 27, replace "other nodes" with -- other sensor nodes --;
line 33, replace "the node" with -- the sensor node --;
line 34, replace "downstream node" with -- downstream sensor node --;
line 37, replace "the node" with -- the sensor node --;
line 40, replace "other nodes" with -- other sensor nodes --;
line 42, replace "A moble" with -- A mobile --;
line 43, replace "central node" to -- central sensor node --;
Column 18, line 2, replace "moble ad hoc" with -- mobile ad hoc --;
line 4, replace "remote nodes" with -- remote sensor nodes --;
line 5, replace "remote node" with -- remote sensor node --;
line 6, replace "central node" with -- central sensor node --;
line 18, replace "central node" with -- central sensor node --;
line 23, replace "remote nodes" with -- remote sensor nodes --;
line 25, replace "other nodes" with -- other sensor nodes --;
line 28, replace "remote node" with -- remote sensor node --;
line 33, replace "remote node" with -- remote sensor node --;
line 34, replace "remote nodes" with -- remote sensor nodes --;
line 37, replace "remote node" with -- remote sensor node --;

Signed and Sealed this

Twenty-first Day of July, 2009

JOHN DOLL
*Acting Director of the United States Patent and Trademark Office*